Figure 1:
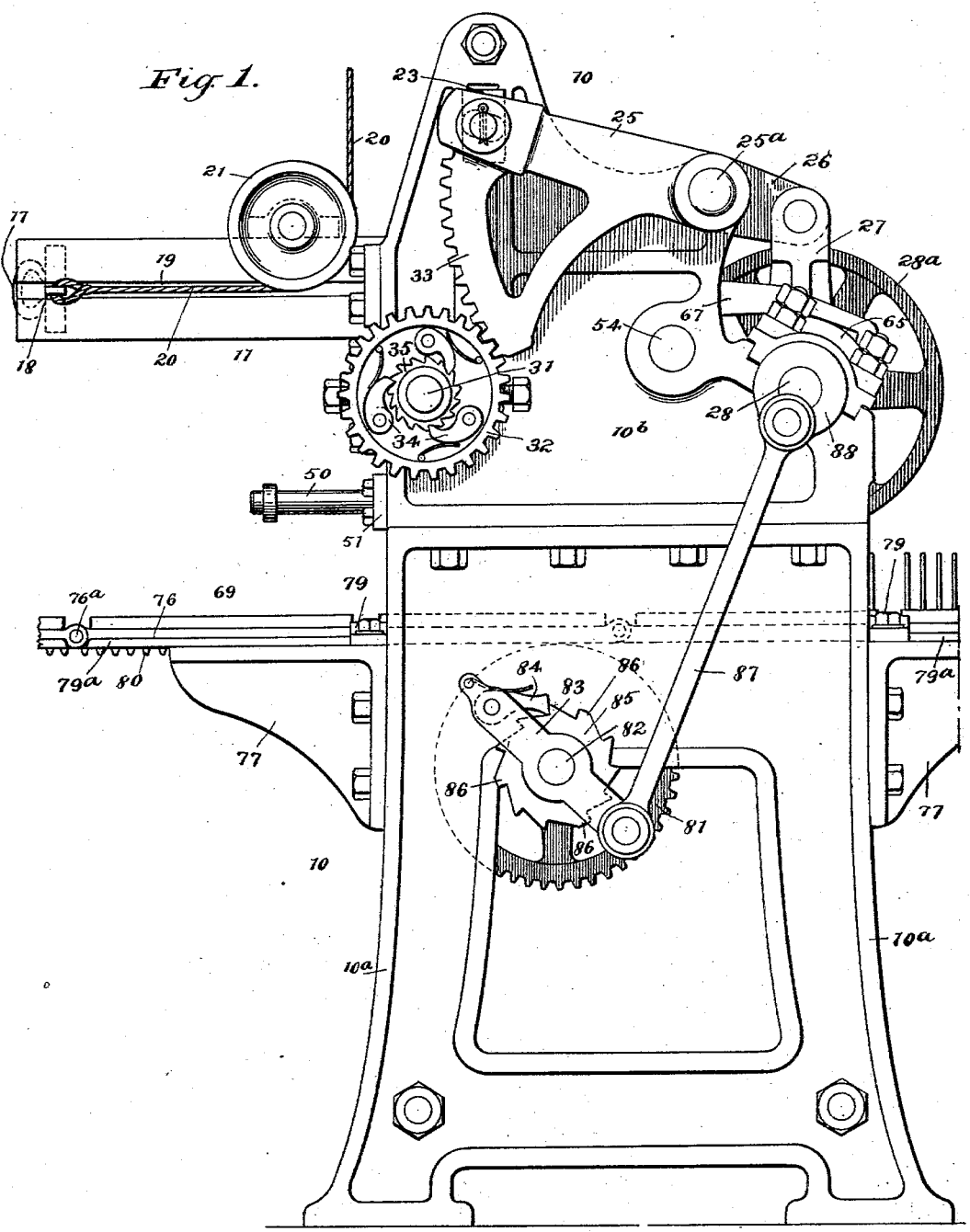

No. 716,809. Patented Dec. 23, 1902.
J. A. E. CRISWELL.
MACHINE FOR MAKING MATCHES.
(Application filed Nov. 16, 1899.)

(No Model.) 7 Sheets—Sheet 1.

WITNESSES: INVENTOR

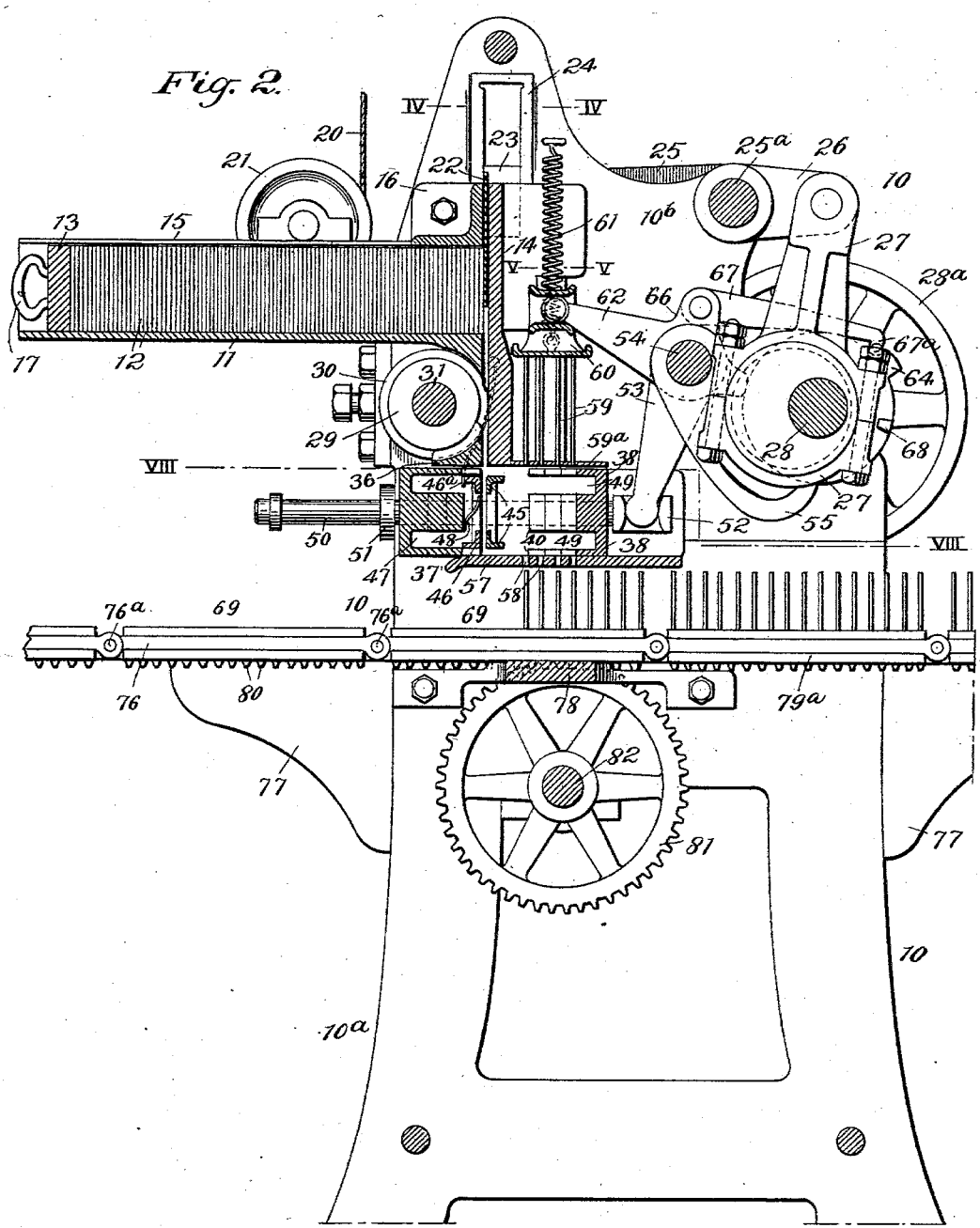

No. 716,809. Patented Dec. 23, 1902.
J. A. E. CRISWELL.
MACHINE FOR MAKING MATCHES.
(Application filed Nov. 16, 1899.)
(No Model.) 7 Sheets—Sheet 3.
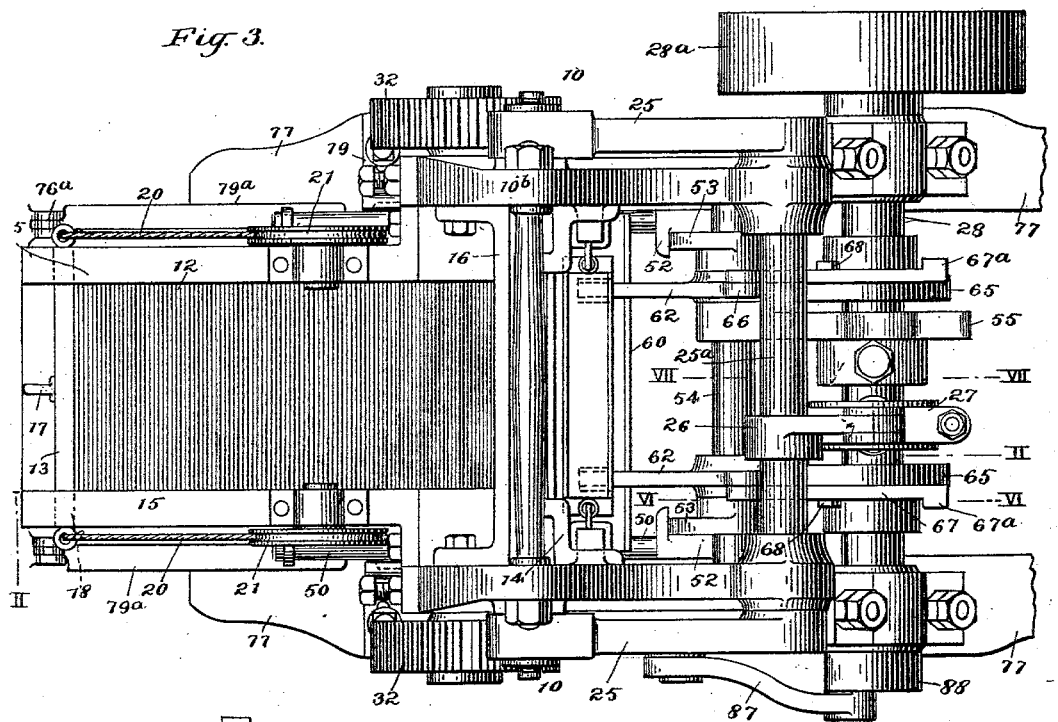
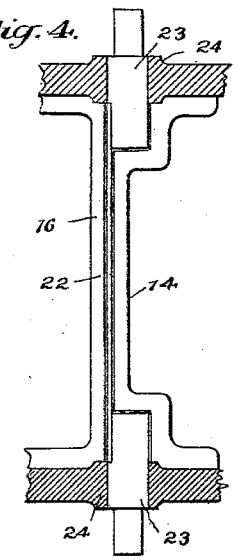
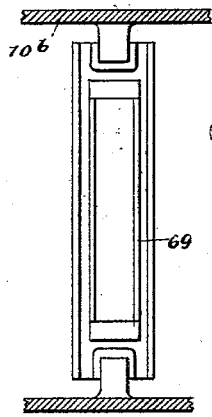
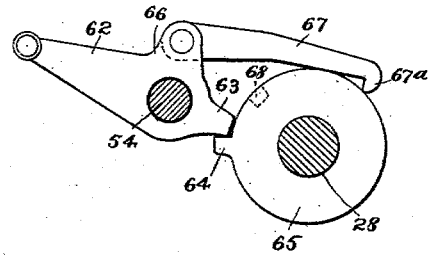
WITNESSES: INVENTOR No. 716,809.　　　　　　　　　　　　　　　　Patented Dec. 23, 1902.
J. A. E. CRISWELL.
MACHINE FOR MAKING MATCHES.
(Application filed Nov. 16, 1899.)
(No Model.)　　　　　　　　　　　　　　　　7 Sheets—Sheet 4.
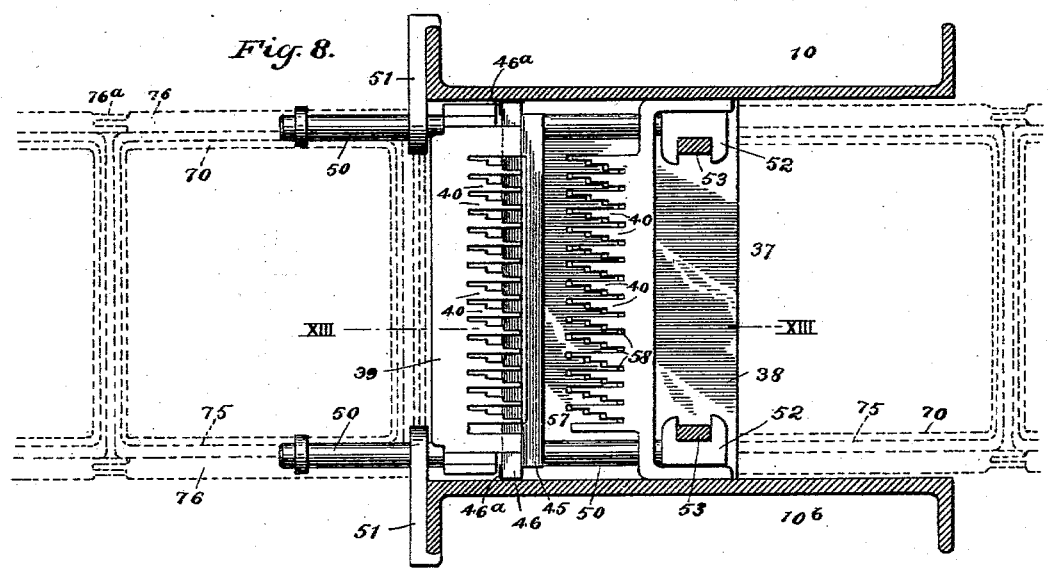
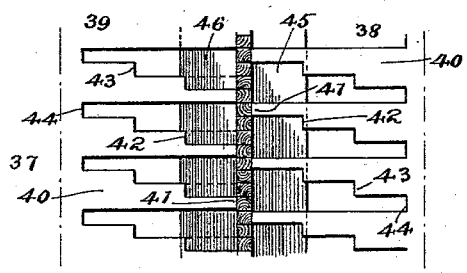
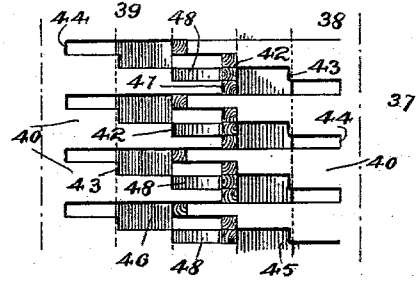
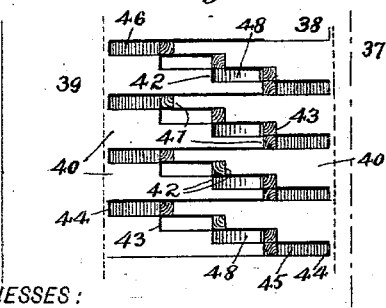
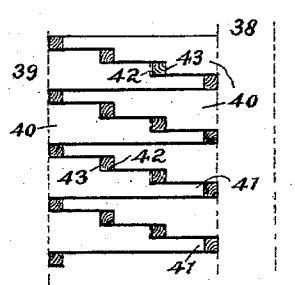
WITNESSES:　　　　　　　　　　　　　　　　INVENTOR No. 716,809. Patented Dec. 23, 1902.
J. A. E. CRISWELL.
MACHINE FOR MAKING MATCHES.
(Application filed Nov. 16, 1899.)
(No Model.) 7 Sheets—Sheet 5.
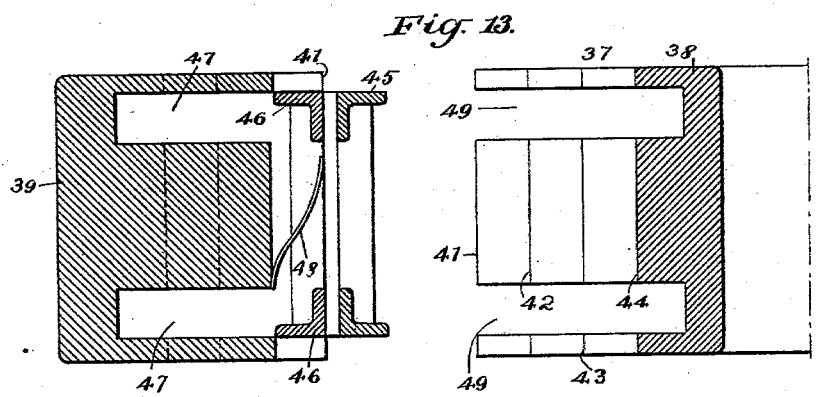
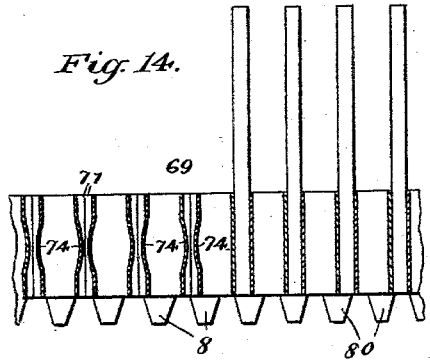
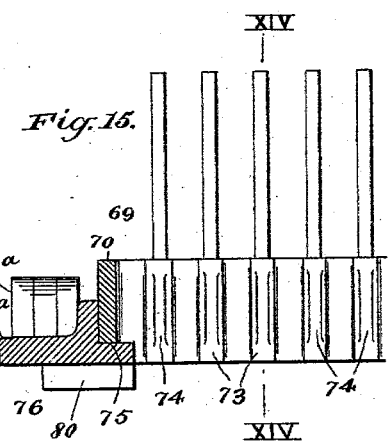
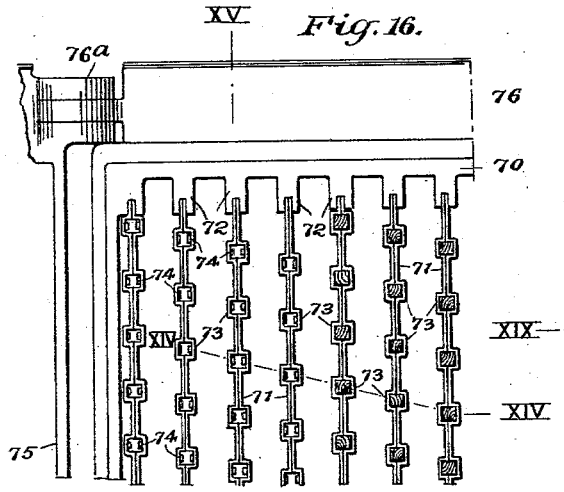
WITNESSES:
William Foster.
F. W. Stanley.
INVENTOR
J. A. E. Criswell.

No. 716,809. Patented Dec. 23, 1902.
J. A. E. CRISWELL.
MACHINE FOR MAKING MATCHES.
(Application filed Nov. 16, 1899.)
(No Model.) 7 Sheets—Sheet 6.
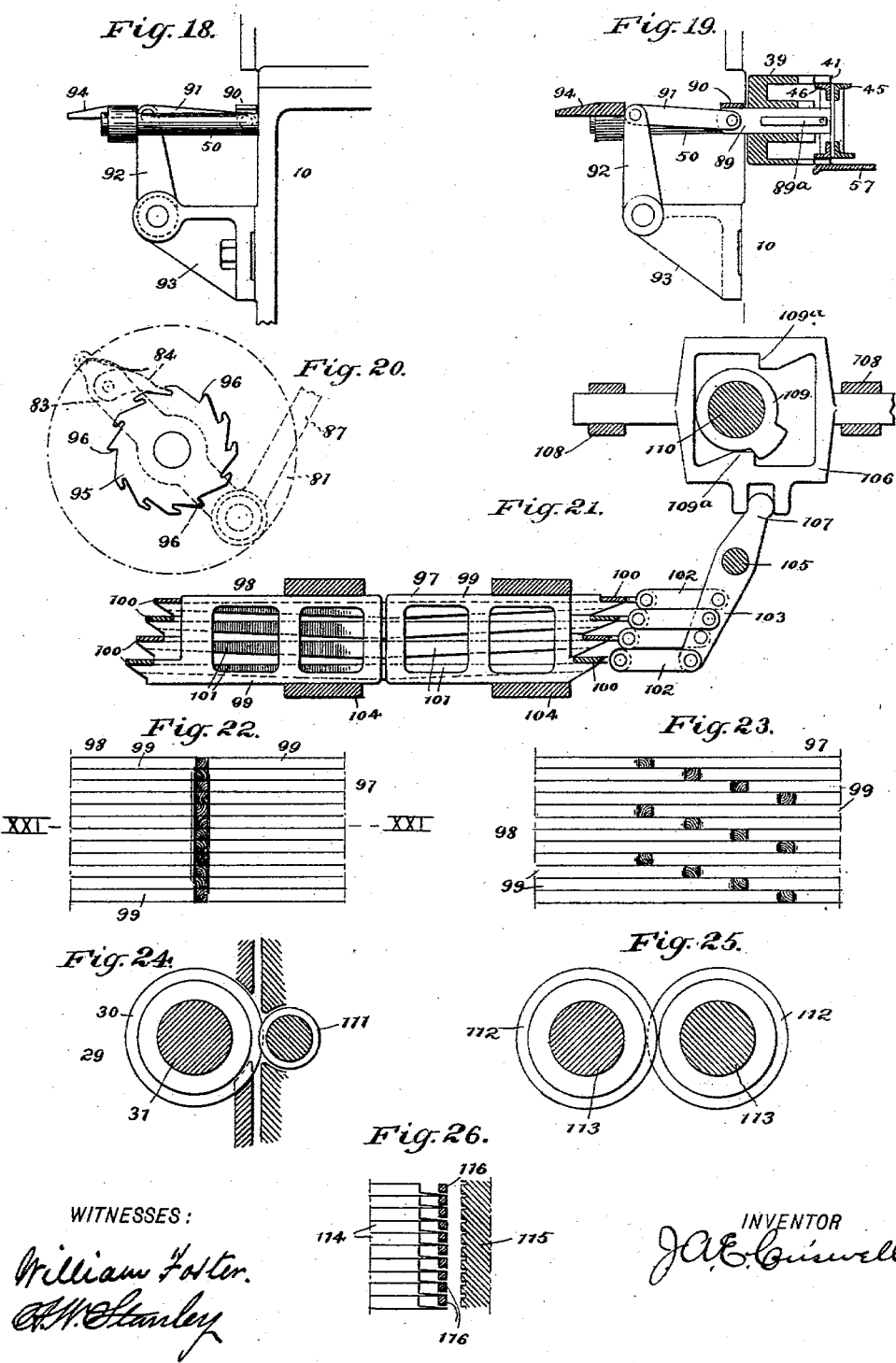

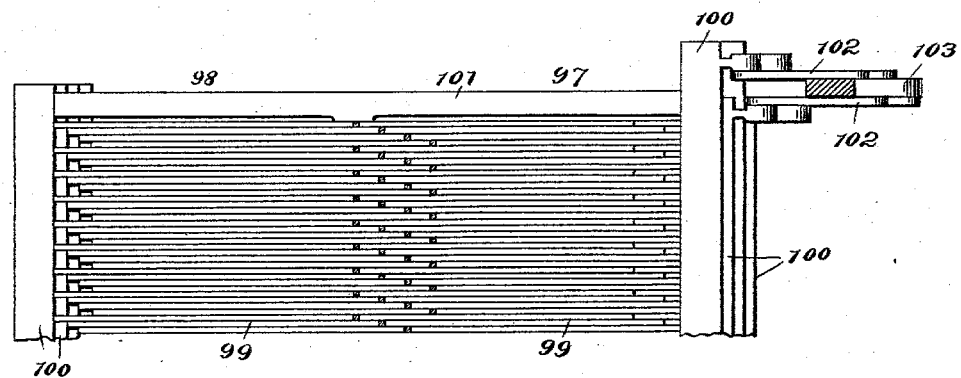

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 716,809, dated December 23, 1902.

Application filed November 16, 1899. Serial No. 737,186. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, and more particularly to machines in which the splints are cut from veneer.

The primary object of the invention is to provide simple and efficient means by which splints may be cut from strips or blanks of veneer and then separated and discharged directly into holding means in position for treatment to complete the matches.

Another object of the invention is to provide simple and efficient means by which the previously-cut splints are separated into a series of more than two independent rows in position to be discharged into the carrier.

A further object is to provide a simple and efficient holding device and carrier for the splints and to provide simple mechanism for operating the carrier.

With these and other objects in view the invention consists in the construction and combination of the several parts, substantially as hereinafter described and then pointed out in the claims at the end of the description.

In the drawings, wherein similar figures of reference designate similar parts, Figure 1 is a side elevation of one form of machine embodying my invention. Fig. 2 is a vertical longitudinal section taken on the line II II of Fig. 3. Fig. 3 is a plan view. Fig. 4 is a fragmentary sectional plan taken on the line IV IV of Fig. 2. Fig. 5 is a fragmentary sectional plan taken on the line V V of Fig. 2. Fig. 6 is a section taken on the line VI VI of Fig. 3, showing the means for operating the plunger device for forcing the splints from the separator. Fig. 7 is a section taken on the line VII VII of Fig. 3, showing the means for operating the movable member of the separator. Fig. 8 is a sectional plan taken on the line VIII VIII of Fig. 2, the carrier and holding device being shown in dotted lines. Figs. 9 to 12, inclusive, are fragmentary plan views, on an enlarged scale, showing the members of the separator in different positions with respect to each other. Fig. 13 is an enlarged vertical section of the separator, taken on the line XIII XIII of Fig. 8. Fig. 14 is an enlarged fragmentary vertical section through the splint-holding device and carrier, taken on the line XIV XIV of Figs. 15 and 16. Fig. 15 is a fragmentary vertical transverse section taken on the line XV XV of Fig. 16. Fig. 16 is a fragmentary plan view of the holding device and carrier. Fig. 17 is a fragmentary plan of the movable member of the separator, showing sliding fingers which may be used in connection with the parts shown in Fig. 13 or as a substitute for other parts. Fig. 18 is a side elevation, on a smaller scale, of the device shown in Fig. 17. Fig. 19 is a vertical section taken on the line IX IX of Fig. 17. Fig. 20 is a slightly-modified form of ratchet-and-pawl mechanism for the carrier. Fig. 21 is vertical section of another form of separator for the splints. Figs. 22 and 23 are fragmentary plan views of the sliding fingers or members of the separator shown in Fig. 21, illustrating the fingers before and after the splints are separated. Figs. 24 and 25 are vertical sections of other forms of cutting devices. Fig. 26 is a sectional plan of still another form of splint-cutting device; and Fig. 27 is a fragmentary sectional plan of the form of separator shown in Fig. 21, the section being taken through the lever 103.

The frame 10 may be of any suitable construction and may comprise the legs $10^a$ and the sections $10^b$, rigidly secured together. On the sections $10^b$ and secured thereto is an open-ended box 11, in which the veneer blanks or cards 12 are placed. These blanks or strips of veneer are of a size equal to the length and thickness of the splints and are of a width sufficient to provide a number of splints. The blanks are forced through the box 11 by a follower 13 against the abutment or plate 14, and over the blanks or cards are projecting ledges 15 and an angle plate or bar 16, which serve to prevent the cards from being forced upward. The follower 13 is provided with a handle 17 and has its ends 18 provided with eyes and passed through and working in the longitudinal slots 19 in the box 11. The eyes on the follower 13 are connected with ropes 20, which pass around sheaves 21 on the box 11, the other ends of the ropes being weighted and passed over suitable sheaves or pulleys (not shown) to cause the follower to constantly exert pressure on the blanks 12, though instead of weights and connections one or more springs may be used. Above the box and vertically movable past its inner open end between the abutment 14 and one face of the plate 16 is a plunger 22. This plunger is secured to the slides 23, Fig. 4, which work in suitable guides 24 in the section 10^b of the frame, and on the slides are lugs or studs, which are engaged by the slotted ends of levers 25. The levers 25 are secured to a rock-shaft 25^a, and on this shaft is an arm 26, operated by an eccentric 27 on the drive-shaft 28, so that as the latter rotates by means of the drive-pulley 28^a or otherwise the levers 25 will receive a vertical movement, which will cause a like movement to be imparted to the plunger 22, so as to force one of the blanks or strips at each reciprocation from the box 11 to a splint-cutting device 29. The cutting device 29 may be of any suitable form or construction. As shown, it consists of a series of circular knives 30, spaced apart equal to the width of the splints and secured to a shaft 31, which extends transversely of the machine. The ends of the shaft or spindle 31 are provided with gears 32, loosely held thereon, which mesh into the racks 33 on the levers 25, and carried by each gear are one or more spring-pressed pawls, which engage teeth of the ratchet-wheels 35, by which the cutters or knives 30 will be given rotary movement during the downward stroke of the plunger 22 and levers 25, but will remain stationary during the upward stroke. The blanks or strips as they are forced downward will pass between the abutment 14, which serves as a backing, and the knives 30 and will be separated by the knives into complete splints, the splints being prevented from following or tending to follow the curvature of the knives by the comb 36, which consists of a plate provided with projections which enter between the cutters or knives.

To separate or divide the splints into independent rows, I provide a suitable separator, as 37. This separator, Figs. 8 to 13, comprises a stationary member 38 and a movable member 39, and each member is provided with a series of fingers 40, having abutments 41, 42, 43, and 44 for the independent rows or sets of splints, this being the number of rows into which the splints are divided by the separator shown, though it is to be understood that the invention is not confined to such number. On the movable member 39 of the separator is a transverse bar 45, fixed to the movable member and forming a backing for the splints. A second transverse bar 46 is opposed to the bar 45 and is yieldingly forced toward the latter bar by the springs 46^a, secured to the frame, so as to form a facing for the splints. The bar 46 is slidingly held on the movable member 39 of the separator and is adapted to move into the openings 47 of this member 39, and, like the transverse bar 45, consists of two angle-plates joined together to form a single bar. As the row of splints are forced downward they will be held in the position they are cut by the abutments 41 of the member 39 and the transverse bars 45 and 46, and in this position the row of complete splints are carried inward toward the stationary member 38. A series of springs 48 are provided, one for each abutment 42 of the member 39, to prevent the displacement of the splints directly opposite, and openings or slots 49 are provided in the stationary member 38, similar to slots or openings 47, for the forward or inward passage of the transverse bar 45. The movable member 39 of the separator is secured on opposite sides to rods 50, which slide in bearings 51, fixed to the frame, and in bearings formed in the stationary member 38. The inner ends of the rods are slotted, as at 52, and are engaged by the ends of levers 53, secured to a transverse shaft 54. To the shaft 54 is secured a cam-lever 55, Figs. 2, 3, and 7, which is given a rocking motion by a cam 56 on the drive-shaft 28. As the levers 55 and 53 are operated the movable member 39 of the separator, with its row of splints, will be carried forward from the position shown in Fig. 8 to that shown in Fig. 9. One set or row of splints will be held here by the abutments 41 of the stationary member and the transverse bar 46, the movable member continuing its movement independent of the transverse bar 46, and when it reaches the abutments 42 of the stationary member 38 will leave another row or set of splints. This latter row or set of splints was free to move in a limited space as soon as the first set of splints was separated, the two remaining sets or rows of splints being positively held at this time by the springs 48, abutments 41, and transverse bar 45. The second set of splints cannot, however, move except in line with the abutments 42, as the springs 48 on one side and the side of the fingers on the other will prevent this. From the position shown in Fig. 10 the member 39 moves to the position shown in Fig. 11, where the third row or set of splints are stopped by the abutments 43, the spring 48 now yielding to the further movement of the movable member until it reaches the position shown in Fig. 12. In this position the abutments of the two members form sockets for the several rows of splints, and as will be readily seen the fingers of one member fit into the spaces between the fingers of the other member. By this means the splints may be readily separated or divided into independent rows while they are under complete control.

The splints may be ejected from the separator by any suitable means. The splints are carried over a bed or plate 57, in which are openings 58, corresponding in number to the sockets formed by the abutments of the separator, and above the separator is a plunger device having the plungers 59, one for each splint. These plungers are guided at one end by the plate or bed 59ª and are secured at their other ends to a vertical movable head 60, which is suitably guided on the frame. The plunger device is forced in one direction by the springs 61 and in the opposite direction or downward by the levers or arms 62, which are journaled loosely on the shaft 54 and are provided with cam ends 63, arranged in the path of movement of the cams 64, the latter being carried by disks secured to the main drive-shaft 28, as best shown in Fig. 6. The cams 64 while rotating will engage the ends 63 of arms 62 and force the plungers downward to eject the splints from the separator, while a quick return movement is effected by the springs 61. As an additional precaution and to be sure of the return movement of the plunger device the arms 62 have projecting portions 66, to which are pivoted levers 67. These levers normally rest on the periphery of the disks 65 and have hooked ends 67ª, which are engaged by cams 68 on the disks 65. When the levers 67 are in the position shown in Fig. 6, the cams 68 will not engage the ends 67ª; but during the downward movement of the plunger device the ends 67ª will be drawn into the path of movement of said cams, so as to be operated thereby either in conjunction with or independently of the springs 61 in case the latter should not work properly.

As the splints are ejected from the separator they are held in the position they were separated by a holding device or carrier. This carrier or holding device 69 may be variously constructed. The holding device consists of a frame 70 of rectangular form, to which are held a number of rows of splint-holding devices. Each row of holding devices comprises two opposed metallic plates 71, which are held by lugs 72 on the frame 70, and each plate is bent at intervals, as at 73, to form with its opposed member or plate individual sockets for the splints. The bent portions 73 are each cut so as to form spring-fingers 74, between which the splints are rigidly held when forced into the sockets by the plungers 59. The frame 70 is supported in pockets 75, formed in an endless linked carrier 76, so as to be readily removable therefrom, the members of the carrier being joined together at 76ª and supported during its movement through the machine by the brackets 77 on the frame and the bar 78, which latter also forms an abutment for the splints when forced into the carrier. On each bracket 77 is a guide 79, which engages and overlaps one edge 79ª of the carrier to assist in alining the latter and holding it in position. The frames 70 may be introduced into or removed from the pockets of the carrier in any suitable manner, and the endless linked carrier may be of sufficient length to permit dipping and heading of the matches, the frames being then removed to permit the heads to set and dry. By having the holding devices for the splints removable from an endless carrier the speed of the machine does not have to be governed by the time necessary for the heads of the matches to dry. The linked members of the carrier are provided with teeth 80, which are adapted to mesh with gears 81, secured to the transverse shaft 82. The shaft 82 has an arm 83, carrying a spring-pressed pawl 84 at one end, which engages the teeth of a ratchet-wheel 85. This ratchet-wheel has teeth 86, Fig. 1, which are different from the other teeth of the ratchet-wheel. These teeth vary in number, according to the length of the linked members of the carrier, and are for the purpose of giving a longer throw to the carrier when one of its movements include a joint between two links. The rod 87, which is operated by the crank 88 on the shaft 28, imparts movement to the pawl 84 a distance equal to or slightly more than the length of the teeth 86. It will be seen then that the pawl will have lost motion while operating on the ordinary teeth of the ratchet equal to the difference in length between these teeth and the teeth 86, so that while operating on the latter teeth the endless carrier will have a greater throw, which permits the carrier to be properly joined together and allows for the space necessary for the pockets 75 in each link.

The invention will be readily understood from the foregoing description when taken in connection with the accompanying drawings.

The parts being in the position shown, with the blanks of veneer 12 in the box 11 and the drive-shaft 28, operated by the pulley 28ª, one of the blanks or cards 12 will be forced to the cutting device 29, which latter is partially rotated during the downward stroke of the plunger by racks 33, engaging the gears 32 on the shaft or spindle 31. The blanks are each carried by one movement of the plunger and cutting device to and just free of the movable member 39 of the separator, and the next movement of the plunger and cutting device carries the completely-severed splints into said movable member, while the position previously occupied by the separated splints is now taken by the next blank. As soon as the single row of complete splints is forced into the movable member between the transverse bars 45 and 46 said member is moved toward the stationary member by rods 50 and their actuating mechanism already described. The splints are divided into four independent rows by the separator, as previously described and as shown most clearly in Figs. 8 to 12. In this position the plungers 59 are given a quick downward movement by their operating mechanism, which forces the separated splints into the holding device. The ratchet-and-pawl mechanism at this time gives movement to the holding device and endless carrier and places the carrier in position to receive a new set of splints. This operation may continue, and as soon as one of the holding devices is filled it may be removed and treated to complete the matches in the usual or in any preferred manner, or the splints may be treated by being dipped and the igniting composition placed thereon and the frames 70 removed to permit the heads to set and dry. The frames 70 may be introduced as well as removed automatically; but this feature, as well as the dipping and placing the igniting composition on the splints, forms no part of this application and may be accomplished in any desired manner.

In Figs. 17 to 19, inclusive, I show splint-engaging devices which may be used in connection with the separator already described or as a substitute for the springs 48 or the transverse bar 46. A series of slides or fingers 89, provided with springs $89^a$ on opposite sides thereof, are slidingly held in the movable member 39 of the separator. These slides are connected by a cross-bar 90, and to said bar are connected links 91, one end of which is pivoted to the upper ends of arms 92. The arms 92 are pivoted to the brackets 93, which latter are fastened to the frame. The arms 50, which operate the members 39 of the separator, are extended somewhat, and a cross-bar or plate 94 is fastened to the ends of said rods. As the rods 50 and the member 39 are moved inward by their operating mechanism, already described, the inner edge of the bar 94 will engage the upper ends of the arms 92, which will cause the slides or fingers 89 to travel with the movable member of the separator; but as soon as the splints held between the ends of the slides and the transverse bar 45 reach the abutments 43 of the stationary member the bar 94 will ride over the ends of the arms 92, which will permit the movable member to continue its further movement independent of the slides. These slides are restored to their former position by the return movement of the movable member 39 of the separator, and said slides form side bearing-surfaces for the splints on opposite sides of the ones held by them after one set or row has been separated, which leaves those free to move in a limited space which are not positively held. It will be seen that during the inward movement of the movable member the springs $89^a$ on the slides will offer a yielding obstruction to the free splints and will tend to keep them against the transverse bar 45 until they reach their abutments.

The ratchet mechanism for the carrier shown in Fig. 20 is only a slight extension of that already described. Where twice the usual throw is desired at stated intervals, the other mechanism will not answer. Here the pawl has a throw equal to a little over twice the distance between the straight or pawl-engaging portion of two teeth. The teeth 95 of the ratchet-wheel, as will be seen, have an overhanging portion which prevents the pawl from slipping down and engaging more than one tooth; but when the teeth 96 are reached the latter, not having an overhanging portion, will permit the pawl to engage it instead of slipping by, so that twice the usual movement to the carrier is imparted.

The separator may be variously constructed, as shown by Figs. 21 to 23, inclusive. The members 97 and 98 are both movable in this instance and may be used in connection with a machine otherwise constructed, substantially as shown in the other views. Each member comprises a series of sliding plates or fingers 99, which are joined together in four different and independently-movable sets by the bars 100. The bar 100 of each set of one member is joined to the corresponding bar of the other member by a tie bar or rod 101, so as to rigidly hold the sets apart equal to or about the thickness of the splints. The tie-rods 101 are located at the opposite sides of the plates or fingers, so as to provide a free open space, slot, or receiver between the opposed ends of the fingers or slides. The bars 100 of each set of fingers, the number of which correspond to one set of splints, are independently connected by the links 102 to levers 103, which latter when operated move the fingers in their bearings 104. The links 102 are connected to the levers 103—usually two—at different distances from its pivot or rocking shaft 105, so that the throw of each set of fingers will vary. At 106 is a cam-head or slide, which is provided with a slot that the upper end 107 of the lever 103 enters. This cam-head works back and forth in bearings 108 and is operated by a cam 109, which engages projections $109^a$ on the cam-head and is secured to a shaft 110. As the lever 103 is operated the fingers will be thrown from the position shown in Figs. 21 and 22 to the position shown in Fig. 23. By this means the splints are readily separated in position to be discharged into the holding device.

In Fig. 24 instead of a stationary abutment a roller 111 is provided to permit the splints to be forced downward more readily, while in Fig. 25 a double series of rotary overlapping knives are provided, which are secured to the transverse shafts 113 and which may be continuously rotated, the distance of the separator from the cutting device varying according to the form of the latter.

Fig. 26 shows a reciprocating cutter-head, with the knives 114, which cut the blanks into splints against the backing 115. Between the knives are ejectors 116, which prevent the splints from following the knives after being cut.

From the foregoing it will be seen that simple and efficient means are provided by which the splints are cut and divided into a series of independent rows or sets and then discharged into a holding device in position for treatment to complete the matches.

While I have described a mechanism for dividing rectangular splints into four independent rows, it is to be understood that the invention is not confined to the kind of splints nor the number of rows into which they may be divided—as, for example, the splints may in some instances, if desired, be divided into three rows.

The fingers of the separator may be made so that the splints would drop into a holding device when separated, or suction instead of the plunger device may be employed by so constructing the fingers as to permit this.

The splints may be made of any suitable material, and the two members of the separator shown in Figs. 1 to 13 may be made to move toward each other instead of one being stationary. Instead of both members of the separator being made entirely of independently-movable or of fixed fingers a part or all of one of the members may be made up of independently-movable slides or fingers.

Having thus described my invention, what I claim as new, and desire to secure by Letters Patent, is—

1. A match-making machine, comprising splint-cutting means, a separator having a movable member and a stationary member which separate the splints into independent rows, means for holding the splints, and a plunger device for forcing the splints from the separator to the holding means.

2. The combination with a splint-cutting device, of a separator comprising a movable and a stationary member each provided with fingers which separate the splints into independent rows, and holding means for the splints.

3. A match-making machine, comprising means for supplying splints, of a separator having separable members receiving the splints in a common plane and provided with independent fingers which separate the splints into a series of more than two independent and parallel rows, and holding means for the splints.

4. In a match-making machine, the combination with splint-cutting means, of a separator comprising a stationary and a movable member each provided with fingers which fit into the other member and separate the splints into independent rows, and holding means for the splints.

5. In a match-making machine, the combination with means for supplying splints, of a separator comprising a stationary and a movable member each provided with fingers which fit into the other member and separate the splints into independent rows, holding means for the splints, and a plunger device for forcing the splints from the separator into the holding means.

6. In a match-making machine, the combination with a splint-cutting device, of a separator comprising a stationary and a movable member, a transverse bar fixed to the movable member and forming a backing for the splints received from the cutting device, and holding means for the splints.

7. In a match-making machine, the combination with a splint-cutting device, of a separator comprising a movable and a stationary member, a transverse bar fixed to the movable member and forming a backing for the splints received from the cutting device, a second transverse bar yieldingly held in the movable member adapted to engage the face of the splints, and holding means for the splints.

8. In a match-making machine, the combination with a splint-cutting device, of a separator comprising a stationary and a movable member, transverse bars one of which is movable engaging opposite faces of the splints, holding means for the splints, and means for forcing the splints from the separator into the holding means.

9. In a match-making machine, the combination with means for supplying splints, of a separator which moves the splints bodily at once comprising a movable and a stationary member which separates the splints into independent rows, independently-movable splint-engaging devices carried by the movable member of the separator, and holding means for the splints.

10. In a match-making machine, the combination with a splint-cutting device, of a separator comprising a movable and a stationary member which separates the splints into independent rows, sliding plates or fingers movable with and independent of the movable member of the separator for retaining and holding the splints, and holding means for the splints.

11. In a match-making machine, the combination with a splint-cutting device, of a separator comprising a stationary and a movable member, transverse bars one of which is movable forming a part of the separator and engaging opposite faces of the splints, splint-engaging devices independently movable of and working in the movable member of the separator, and holding means for the splints.

12. In a match-making machine, the combination with a splint-cutting device, of a separator which separates the splints into independent rows, a series of sliding plates or fingers connected together and working in the separator, arms pivotally connected to the sliding plates, a transverse bar or rod carried by the separator and adapted to operate the sliding plates in one direction, and holding means for the splints, substantially as and for the purpose set forth.

13. In a match-making machine, the combination with a splint-cutting device, of a separator comprising movable and stationary members and having independent sliding plates or fingers and adapted to separate the splints into independent rows, and holding means for the splints.

14. In a match-making machine, the combination with a splint-cutting device, of a separator comprising two members each having fingers forming sockets for the splints the fingers of one member fitting between the fingers of the other member and separating the splints into a series of more than two independent rows, and holding means for the splints.

15. In a match-making machine, the combination with a splint-cutting device, of a separator comprising a stationary and a movable member each having fingers forming sockets for the splints, the fingers of one member fitting between the fingers of the other member to separate the splints into a series of independent rows, holding means for the splints, and a plunger device working between the fingers of the separator and forcing the splints into the holding means.

16. In a match-making machine, the combination with a splint-cutting device, of a separator receiving the splints endwise from the cutting device and which divides the splints into independent rows, rods movable beneath the cutting device, levers and means for operating the levers and rods to cause the separator to divide the splints, and holding means receiving the splints from the separator.

17. A match-making machine, comprising a splint-cutting device, means for feeding blanks the length of the splints to the cutting device, a separator receiving complete splints and separating the same into independent rows, holding means for the splints, and a plunger device supplemental to and independent of the feeding means and the separator and operating with and engaging the separator at intervals for forcing the splints from the separator into the holding means.

18. A match-making machine, comprising a splint-cutting device, plunger mechanism for successively forcing blanks or cards to the cutting device, a separator carrying the splints to one side of the cutting device and dividing the splints into independent rows, holding means for the splints, and a plunger device supplemental to and independent of the feeding means and the separator and operating with and engaging the separator at intervals for forcing the splints from the separator into the holding means.

19. In a match-making machine, the combination with a splint-cutting device, means for feeding blanks or cards of veneer to the cutting device, a separator comprising a stationary and a movable member which separates the splints into more than two independent rows, and holding means for the splints.

20. In a match-making machine, the combination with a splint-cutting device, of a separator dividing the splints into a series of more than two independent rows, holding means for the splints, and a plunger device entering the separator for forcing the splints from the separator into the holding means.

21. In a match-making machine a splint-holding device adapted to hold a series of rows of splints, comprising a frame, and two opposed metallic plates for each row fixed to the frame and bent to form independent sockets for the splints, the sockets of each plate being cut to form spring-fingers to rigidly hold the splints in position for treatment, substantially as described.

22. In a match-making machine, the combination with means for supplying splints, of a separator receiving the splints endwise in a common plane moving them bodily at once and separating them into four independent rows, and holding means for the splints.

23. In a machine for making matches, the combination with means for supplying splints, of a separator comprising a movable and a stationary member receiving the splints in a common plane and separating them into four independent parallel rows, and holding means for the splints.

24. In a machine for making matches, the combination with means for supplying splints, of a separator comprising a movable and a stationary member receiving the splints in a common plane moving them bodily at once and separating them into a series of more than two independent rows, and holding means for the splints.

25. In a match-making machine, the combination with splint-cutting means cutting the splints in a close row, of a separator comprising a movable and a stationary member moving the splints bodily at once and dividing the splints into a series of more than two independent rows, and holding means for the splints.

26. In a machine for making matches, the combination with means for supplying splints, of a separator comprising a movable and a stationary member receiving the splints in a common plane and separating them into independent parallel rows, holding means for the splints, and a plunger device for forcing the splints from the separator into the holding means.

27. In a match-making machine, the combination with means for supplying splints, of a separator comprising a movable and a stationary member receiving the splints in a common plane and separating them into a series of more than two independent parallel rows, holding means for the splints and a plunger device for forcing the splints from the separator into the holding means.

28. In a match-making machine, the combination with a splint-cutting device cutting the splints in a close row, of a separator comprising a movable and a stationary member receiving the splints in a common plane and separating them into a series of more than two independent rows, and holding means for the splints.

29. In a match-making machine, the combination with a splint-cutting device cutting the splints in a close row, of a separator comprising a movable and a stationary member receiving the splints in a common plane and separating them into a series of more than two independent parallel rows, holding means for the splints, and a plunger device for forcing the splints from the separator into the holding means.

30. In a match-making machine, the combination with splint-cutting means, of a separator carrying the splints bodily at once and by a reciprocatory action separating them into a series of more than two independent rows, and holding means for the splints.

31. A match-making machine, comprising a separator carrying the splints in a single row bodily at once and by a reciprocatory action dividing the splints into a series of more than two independent rows, and holding means for the splints.

32. In a match-making machine, the combination with means for supplying splints, of a separator receiving the splints in a common plane and by a reciprocatory action separating them into a series of more than two independent parallel rows, and holding means for the splints.

33. In a match-making machine, the combination with splint-cutting means cutting the splints in a close row, of a separator separating the splints by movement therewith and carrying a splint bodily at once and dividing the splints into a series of more than two independent rows, and holding means for the splints.

34. In a match-making machine, the combination with a splint-cutting device having knives spaced apart and in operation cutting the splints in a close row, of a separator operating by a reciprocatory action and dividing the splints into a series of more than two independent rows, and holding means for the splints.

35. In a match-making machine, the combination with a splint-cutting device cutting the splints in a close row, of a separator receiving the splints in a common plane and operating by a reciprocatory action to separate the splints into a series of more than two independent parallel rows, and holding means for the splints.

36. In a match-making machine, the combination with splint-cutting means, of a separator receiving the splints endwise and by a reciprocatory action moving them bodily at once and separating them in right lines parallel to each other and into more than two independent rows, and holding means for the splints.

37. In a match-making machine, the combination with a splint-cutting device, means for feeding cards the length of the splints to the cutting device, of a separator receiving the splints endwise and moving them bodily at once and separating the splints by movement therewith into right lines parallel to each other and into more than two independent rows, and a carrier receiving the splints from the separator.

38. In a match-making machine, the combination with a splint-cutting device, and means for feeding veneer cards the length of the splints to the cutting device, of a separator into which the splints are forced endwise in a single row and which moves such row bodily at once, and separates it by movement therewith in right lines parallel to each other and into more than two independent rows, and holding means for the splints.

39. In a match-making machine, the combination with splint-cutting means, of a separator receiving the splints endwise and separating them by movement therewith in a right line and into more than two independent rows, holding means for the splints, and plungers for forcing the splints from the separator into the holding means.

40. In a match-making machine, the combination with a splint-cutting device, and means for feeding cards the length of the splints to the cutting device, of a separator receiving the splints endwise and separating them by movement therewith in right lines parallel to each other and into more than two independent rows, a carrier receiving the splints from the separator, and a plunger device for forcing the splints from the separator into the carrier.

41. In a match-making machine, the combination with splint-cutting means, and means for feeding cards of veneer the length of the splints to the cutting means, of a separator into which the splints are forced endwise in a single row and which separates them in right lines parallel to each other and into more than two independent rows, holding means for the splints, and plungers for forcing the splints from the separator into the holding means.

42. In a match-making machine, the combination with splint-cutting means, and means for forcing blanks or cards the length of the splints to the cutting means, of a separator into which the splints are forced endwise and which carries the splints and separates them by movement therewith in right lines parallel to each other and into independent parallel rows to the side of the cutting means, holding means for the splints, and plungers for forcing the splints from the carrier into the holding means, for the purpose set forth.

43. In a machine for making matches, the combination with splint-cutting means and means for feeding the splint material to the cutting means, of means reciprocating in a right line for carrying the splints to the side of the cutting means and holding them separated and in independent rows, holding means for the splints, and plungers supplemental to the feeding means and operating with the separator for forcing the separated splints into the holding means.

44. In a match-making machine, the combination with splint-cutting means, of a plunger for forcing blanks or cards to the cutting device, a separator comprising movable and stationary members receiving the splints endwise and carrying the latter to the side of the cutting device, holding means for the splints, and plungers for forcing the splints from the separator into the holding means.

45. In a machine for making matches, the combination with splint-cutting means, of a plunger for forcing blanks or cards of the length of the splints to the cutting means, a separator comprising movable and stationary members carrying the splints bodily to the side of the cutting means, and separating them into independent rows, a carrier for the splints, and plungers for forcing the splints from the separator direct into the carrier so as to enter the latter before entirely leaving said separator.

46. In a match-making machine, the combination with means for supplying splints, of a separator comprising stationary and movable members receiving the splints endwise holding them and carrying the splints in independent parallel rows to the side of the splint-supplying means, a carrier, and plungers independent of the splint-supplying means for forcing the separated splints into the carrier.

47. In a machine for making matches, the combination with splint-cutting means and means for forcing splint material to the cutting means, of a separator comprising stationary and movable members, means for reciprocating the movable parts of the separator to carry the splints to the side of the cutting means, a carrier, and plungers for forcing the splints from the separator into the carrier.

48. In a machine for making matches, the combination with a splint-cutting device, of means reciprocatory in a right line merely for carrying the splints to the side of the cutting device and holding them separated and in independent rows, a carrier, and plungers for forcing the separated splints into the carrier.

49. In a match-making machine, the combination with splint-cutting means, means for feeding blanks or cards the length of the splints to the cutting means, a separator receiving the splints moving them bodily at once and separating them into more than two independent rows to the side of the cutting means, holding means for the splints, and plungers for forcing the splints from the separator into the holding means.

50. In a match-making machine, the combination with splint-cutting means, of means for separating the splints into more than two independent rows and for carrying them bodily at once to the side of the cutting means, holding means for the splints, and plungers for forcing the separated splints from the separator into the holding means.

51. In a match-making machine, the combination with a splint-cutting device, means for forcing the splint material to the cutting device, means for separating the splints into independent rows, a carrier, and plunger means independent of the splint-material-feeding means and the separator and engaging with the latter at intervals for forcing the separated splints into the carrier.

52. In a match-making machine, the combination with splint-cutting means, of means for feeding blanks or cards the length of the splints to the cutting means, a separator comprising movable and stationary members receiving the splints endwise and separating them in right lines parallel to each other and into independent parallel rows to the side of the cutting means and at right angles to the plane in which they are cut, and holding means for the splints.

53. In a match-making machine, the combination with splint-cutting means, and means for forcing blanks or cards the length of the splints to the cutting means, of a separator comprising movable and stationary members into which the splints are forced endwise and which carries and separates the splints into more than two independent parallel rows, and holding means for the splints.

54. In a match-making machine, the combination with splint-cutting means, and means for forcing blanks or cards the length of the splints to the cutting means, of a separator comprising movable and stationary members into which the splints are forced endwise and which carries the splints and separates them in right lines parallel to each other and into more than two independent parallel rows, holding means for the splints, and plungers for forcing the splints from the separator into the holding means.

55. In a match-making machine, the combination with splint-cutting means, and means for forcing blanks or cards the length of the splints to the cutting means, of a separator comprising movable and stationary members into which the splints are forced endwise, the splints being carried and separated in a line at right angles to the plane in which they are received into independent rows parallel to the plane in which they are received and at one side of the cutting means, and a carrier receiving the splints from the separator.

56. In a match-making machine, the combination with splint-cutting means, and means for forcing blanks or cards the length of the splints to the cutting means, of a separator comprising movable and stationary members into which the splints are forced endwise, the splints being carried and separated into independent rows in the plane in which they are received and at one side of the cutting means, a carrier and plunger for forcing the splints from the separator into the carrier.

57. In a match-making machine, the combination with a splint-cutting device, of a separator having reciprocatory and fixed members located beneath the cutting device and dividing the splints into a series of independent rows, and holding means for the splints.

58. In a match-making machine the combination with a splint-cutting device, of a separator having fixed and reciprocatory members and which moves the splints bodily at once and divides the splints into independent rows, and holding means for the splints.

59. In a match-making machine, the combination with splint-cutting means, of a separator moving the splints bodily at once and having movable and fixed or stationary members which divide the splints into independent rows, and holding means for the splints.

60. In a match-making machine, the combination with splint-cutting means, of a separator having fixed and reciprocatory members which divide the splints into independent rows, a carrier, and plungers for forcing the splints from the separator into the holding means.

61. In a match-making machine, the combination with splint-cutting means, of a separator having fixed and reciprocatory members which divide the splints into independent rows, holding means for the splints, and plungers for forcing the splints from the separator into the holding means.

62. A match-making machine, comprising a separator having fixed and reciprocatory members carrying the splints bodily at once in a single row and dividing such row into more than two independent rows, and holding means for the splints.

63. In a match-making machine, the combination with a separator having fixed and reciprocatory members carrying the splints bodily at once in a single row and dividing such row into a series of more than two independent rows, holding means for the splints, and plungers for forcing the splints from the separator into the holding means.

64. In a machine for making matches, the combination with a splint-cutting device having knives or cutters spaced apart and in operation cutting the splints in a close row, of a separator having fixed and reciprocatory members dividing the splints into a series of more than two independent rows, and holding means for the splints.

65. In a machine for making matches, the combination with a splint-cutting device having knives or cutters spaced apart and in operation cutting the splints in a close row, of a separator having fixed and reciprocatory members dividing the splints into a series of more than two independent rows, a carrier, and plungers for forcing the splints from the separator into the carrier.

66. In a match-making machine, the combination with means for supplying splints, of a separator having fixed and reciprocatory members receiving the splints in a common plane and separating them into a series of more than two independent rows, holding means for the splints, and plungers for forcing the splints into the holding means.

67. In a match-making machine, the combination with a splint-cutting device cutting the splints in a close row, of a separator having fixed and reciprocatory members receiving the splints in a common plane and separating them into a series of more than two independent parallel rows, and holding means for the splints.

68. In a match-making machine, the combination with a splint-cutting device, and means for feeding cards the length of the splints to the cutting device, of a separator having fixed and reciprocatory members receiving the splints endwise in a single row and separating such row in right lines parallel to each other and into more than two independent rows, a carrier receiving the splints from the separator, and a plunger device for forcing the splints from the separator into the carrier.

69. In a match-making machine, the combination with a splint-cutting device, and means for feeding veneer cards the length of the splints to the cutting device, of a separator having fixed and reciprocatory members into one of which the splints are forced endwise in a single row and which carries such row bodily at once and with the fixed member separates the splints in right lines parallel to each other and into more than two independent rows, holding means for the splints, and a plunger device for forcing the splints from the separator into the holding means.

70. The combination with splint-cutting means, of a separator comprising independent relatively stationary and movable members which separate the splints into independent rows, and holding means for the splints.

71. The combination with splint-cutting means, of a separator comprising independent relatively stationary and movable members which separate the splints into more than two independent rows, a carrier for the splints, and plungers for forcing the splints from the separator into the carrier.

72. In a match-making machine, the combination with splint-cutting means, of a separator having fixed or stationary members and a movable member which receives the splints in a single row and which carries the splints bodily at once and as it meets the fixed member will divide the splints into independent rows, and holding means for the splints.

73. In a match-making machine, the combination with means for supplying splints, of a separator having a fixed or stationary member and movable means which receives the splints in a single row and which carries the splints bodily at once and as the row reaches the fixed member the row will be divided into independent rows, a carrier, and plungers for forcing the splints from the separator into the carrier.

74. In a match-making machine, the combination with means for cutting splints, of a separator having a fixed or stationary member and a movable member which receives the splints endwise in a single row and which carries such row bodily at once to the side of the cutting means and together with the fixed or stationary member divides the splints into a series of more than two independent rows, and holding means for the splints.

75. In a match-making machine, the combination with means for cutting splints, of a separator having a fixed or stationary member provided with fingers and a movable member also provided with fingers which receives the splints endwise and carries them bodily at once and together with the fingers of the fixed member separates the splints into independent rows, holding means for the splints, and plungers for forcing the splints from the separator into the holding means.

76. In a match-making machine, the combination with means for cutting splints, of a separator having a fixed or stationary member provided with fingers and a reciprocatory member also provided with fingers which receives the splints endwise and carries them bodily at once to the side of the cutting means and together with the fingers of the fixed member separates the splints into more than two independent rows, holding means for the splints, and plungers independent of the separator for forcing the splints from said separator into the holding means.

77. In a match-making machine, the combination with splint-cutting means, of a separator having fixed or stationary means provided with fingers forming abutments for the splints, and movable means carrying the splints bodily against the abutment of the fixed or stationary means and separating the splints into independent rows during the movement of the movable means, and holding means for the splints.

78. In a match-making machine, the combination with splint-cutting means, of a separator having fixed or stationary means provided with abutments for the splints and movable carrying means receiving the splints endwise in a single row and carrying the splints bodily at once against the fixed abutments and separating the splints into more than two independent rows, a carrier, and plungers for forcing the splints from the separator into the carrier.

79. In match-making machinery, the combination with splint-cutting means, of devices movable with the splints and carrying the latter sidewise to the side of the cutting means in the same direction but to different distances, and means for delivering the splints endwise to the devices.

80. In a machine for making matches, the combination with splint-cutting means, of a separator having devices movable with the splints and carrying the latter to the side of the cutting means in the same direction but in different degree, means for delivering the splints endwise to the separator, holding means for the splints, and plungers entering the separator at intervals for forcing the splints from the devices of the separator into the holding means.

81. In a machine for making matches, the combination with splint-supplying means, of a separator moving the splints bodily at once and provided with independent devices which hold the splints separated and which carry them to the side of the splint-supplying means, means for delivering the splints endwise to the separator, a dipping-carrier for the splints, and plungers entirely independent of the separator and its movement for forcing the splints from the separator-holding devices into the carrier.

82. In match-making machinery, the combination with means for carrying a single row of splints bodily to the side of the cutting means, and separating the row into a series of independent rows, means for delivering the single row of splints endwise to the separating means, dipping means for the splints, and plungers independent of the splint-delivery means and the separating means and engaging the latter at intervals for forcing the splints from the said separating means into the dipping means.

83. In match-making machinery, the combination with splint-cutting means, of movable means into which the splints are delivered endwise and which carries the splints bodily at once to the side of the cutting means and holds them separated in independent rows, means for delivering the splints endwise to said movable means, a dipping-carrier, and plungers entering the movable means at intervals for forcing the splints into said carrier.

84. In match-making machinery, the combination with splint-cutting means, of a separator having movable devices engaging the splints and moving them and separating them into more than two independent rows, holding means for the splints, together with plungers entirely independent of the separator and engaging the latter at intervals for forcing the splints from the separator into the holding means.

85. In match-making machinery, the combination with splint-cutting means, of devices movable with the splints and carrying the latter to one side of the cutting means in the same direction but in different degree, dipping means for the splints, and plungers entirely independent of the movable devices and engaging the latter at intervals for forcing the splints from the splint-carrying means into the dipping means.

86. In match-making machinery, the combination with a separator carrying the splints bodily to the side of the cutting means in the same direction but in different degree, means for delivering the splints endwise to the separator, dipping means for the splints, together with plungers independent of the separator and entering the latter at intervals for forcing the splints from the separator into the dipping means.

87. In match-making machinery, two members each having fingers forming sockets for the splints, the fingers of one member fitting between the fingers of the other member and separating the splints into more than two independent rows.

88. In match-making machinery, two members each having fingers forming sockets for the splints, the fingers of one member fitting between the fingers of the other member and separating the splints into a series of more than two independent rows, and springs carried by certain of said fingers whereby the splints may be yieldingly held and prevented from displacement during the separation thereof.

89. In match-making machinery, two members provided with opposed fixed fingers that intermesh when moved toward each other and separate the splints into more than two independent rows, means for delivering the splints endwise, together with means for causing the fingers to move toward each other and thereby separate the splints.

90. In match-making machinery, the combination with rotary cutters, of devices for receiving the splints therefrom adapted to convey the same to carrier-frames, means for reciprocating the splint devices, carrier-frames for the splints, plungers for expelling the splints from the devices and forcing them into the frames after the devices have been moved in one direction, and means for giving a step-by-step movement to the carrier-frames.

91. In match-making machinery, the combination with rotary cutters, a feed-plunger for feeding veneer cards thereto, and means for reciprocating the feed-plunger, of devices for receiving the splints into which the veneer cards are separated by the cutters and for conveying the same to carrier-frames, means for intermittently reciprocating the devices once for every reciprocation of the said feed-plunger, plungers for expelling the splints from the devices into carrier-frames, after the devices have been moved in one direction, and means for intermittently reciprocating the plungers.

92. In match-making machinery, the combination with rotary cutters, a feed-plunger for feeding veneer cards thereto, and means for reciprocating the feed-plunger, of devices for receiving the splints into which the veneer cards are separated by the cutters and for conveying the same to carrier-frames, a cam for intermittently reciprocating the devices, plungers for expelling the splints from the devices, and a cam for intermittently reciprocating the plungers, the said cams connected to rotate in unison and the active portion of one cam adapted to operate during the dwell portion of the other cam.

93. In match-making machinery, the combination with rotary cutters, splint devices arranged beneath the cutters, means for delivering the splints endwise to the devices, and means for reciprocating the said devices, of means for preventing splints at certain times from passing clear through and past the said devices, and splint-carriers arranged beneath the said devices and adapted to receive the splints from the devices when the said devices have been moved in one direction.

94. In match-making machinery, the combination with rotary cutters, a feed-plunger for feeding veneer cards thereto, and means for reciprocating the feed-plunger, of devices for receiving the splints into which the veneer cards are separated by the cutters, and for conveying the same to the carrier-frames, and means for intermittently reciprocating the devices once for every reciprocation of the said feed-plunger.

95. In match-making machinery, the combination with rotary cutters, devices for receiving the splints therefrom, adapted to convey the same to a dipping-carrier, means for delivering the splints endwise to the devices, means for moving the devices and the splints to the side of the cutters, and plungers entirely independent of the devices and entering the latter at intervals for expelling the splints from said devices and forcing them into the dipping-carrier after the devices have been moved in one direction.

96. In match-making machinery, the combination with devices for receiving the splints endwise, means for delivering the splints endwise to the devices, a cam for intermittently reciprocating the devices, dipping carriers or frames for the splints, plungers entirely independent of the devices and their movement and entering the said devices at intervals for forcing the splints into the carrier, and a cam for intermittently reciprocating the plungers, the said cams connected to rotate in unison and the active portion of one cam adapted to operate during the dwell portion of the other cam.

97. In match-making machinery, the combination with devices adapted to receive splints endwise, means for delivering the splints endwise to the devices, means for reciprocating said devices, means for preventing splints at certain times from passing clear through from between said devices, and a dipping-carrier adapted to receive the splints from the devices when the said devices have been moved in one direction.

98. In match-making machinery, the combination of devices for receiving splints, means for delivering the splints endwise to said devices, means for moving said devices, a plate or bed arranged beneath the devices for preventing the splints at certain times from passing beneath and away from said devices, and splint-carriers arranged to receive the splints from the devices when the latter have been moved in one direction.

99. In match-making machinery, the combination with devices for receiving the splints, means for delivering the splints endwise to the devices, pivotally-held levers, means for operating the levers, and connections between the levers and the devices for operating the latter to separate the splints, and dipping means for the splints.

100. In match-making machinery, the combination with devices for receiving splints, means for delivering the splints endwise to the devices, pivotally-held levers, means for operating the levers, connections between the levers and the devices for operating the latter to separate the splints, dipping means for the splints, together with plungers for forcing the splints from the devices into the dipping means.

101. In match-making machinery, the combination with a series of devices adapted to receive splints, means for delivering the splints endwise to the devices, a dipping-carrier, plungers for expelling the splints from the devices into the dipping-carrier, means for positively forcing the plungers to enter the devices at intervals for expelling the splints therefrom, a spring or springs for returning the plungers to their normal position, and auxiliary means to assist in removing the plungers from the devices in case the spring or springs should fail to work.

JAMES A. EKIN CRISWELL.

Witnesses:
 WILLIAM FOSTER,
 A. W. STANLEY.